United States Patent [19]

Inoue

[11] Patent Number: 5,680,382
[45] Date of Patent: Oct. 21, 1997

[54] OPTICAL INFORMATION RECORDING APPARATUS AND METHOD CAPABLE OF HANDLING A PLURALITY OF CARD-LIKE RECORDING MEDIA OF DIFFERENT REFLECTANCE

[75] Inventor: Masato Inoue, Kawasaki, Japan

[73] Assignee: Canon Kabushiki Kaisha, Tokyo, Japan

[21] Appl. No.: 44,004

[22] Filed: Apr. 8, 1993

[30] Foreign Application Priority Data

Apr. 10, 1992 [JP] Japan .................................. 4-118198
Nov. 26, 1992 [JP] Japan .................................. 4-337804

[51] Int. Cl.⁶ .................................................. G11B 7/00
[52] U.S. Cl. ........................... 369/58; 235/454; 369/116
[58] Field of Search ........................... 369/44.26, 44.29, 369/44.35–44.37, 54, 58, 116; 235/454, 456

[56] References Cited

U.S. PATENT DOCUMENTS

| | | | |
|---|---|---|---|
| 4,890,273 | 12/1989 | Takeuchi et al. | 369/58 X |
| 5,023,854 | 6/1991 | Satoh et al. | 369/58 X |
| 5,042,020 | 8/1991 | Endo | 369/58 X |
| 5,113,061 | 5/1992 | Tanaka | 369/58 X |
| 5,128,920 | 7/1992 | Yamamuro | 369/58 X |

FOREIGN PATENT DOCUMENTS

| | | |
|---|---|---|
| 0303373 | 2/1989 | European Pat. Off. . |
| 0429045 | 5/1991 | European Pat. Off. . |
| 0446412 | 9/1991 | European Pat. Off. . |
| 0478275 | 4/1992 | European Pat. Off. . |
| 4-034724 | 2/1992 | Japan . |

OTHER PUBLICATIONS

Patent Abstracts of Japan, vol. 13, No. 108, (P843), Mar. 15, 1989, & JP 63-285730.

*Primary Examiner*—W. R. Young
*Attorney, Agent, or Firm*—Fitzpatrick, Cella, Harper & Scinto

[57] ABSTRACT

A magnetooptical information recording-reproducing apparatus is adapted to function for any card-like optical recording media having different properties. A light beam is applied to a predetermined location of the recording medium and a reflected light caused upon the application of the light beam is detected so as to detect the property of the recording medium such as a reflectance. The gains of a signal reproducing system, a tracking control system and a focusing control system are controlled to vary according to the detection result concerning the property of the recording medium so that a reproduction signal, a tracking error signal and a focusing error signal assume predetermined levels, respectively.

8 Claims, 11 Drawing Sheets

$P = (Si/S) \times Pi$

OPTICAL INFORMATION RECORDING APPARATUS AND METHOD CAPABLE OF HANDLING A PLURALITY OF CARD-LIKE RECORDING MEDIA OF DIFFERENT REFLECTANCE

BACKGROUND OF THE INVENTION

1. Field of the Invention

This invention relates to an optical information recording apparatus and method for recording and/or reproducing information on an optical information recording medium, and particularly to an optical information recording-reproducing apparatus and method for optical cards for effecting the recording and reproduction of information while an optical head and various optical cards are reciprocally moved relative to each other.

2. Related Background Art

Various mediums such as optical discs, optical cards and optical tapes are known as the forms of a medium for recording and reproducing information thereon by the use of light. These have their respective features and are used properly depending on purposes and uses, and above all, optical cards are expected to widen their use more and more in the future because of their features such as the ease of manufacture, good portability and good accessibility.

In each of these optical cards, it is usual that a plurality of tracking tracks are provided in parallel with to the longer sides of the card and the space between two adjacent tracking tracks is used as an information track for recording information thereon, and the tracking tracks are utilized as a guide for auto-tracking (AT) which controls an information recording-reproducing light spot so as not to deviate from a predetermined information track when the light spot scans the information track during the recording and reproduction of information. In the acutal recording and reproduction of information, utilization is also made of auto-focusing (AF) which controls the light spot so as to be properly focused on the surface of the recording medium. Such AT and AF are popular techniques which have heretofore been often used in apparatuses using light to effect the recording and reproduction of information.

FIG. 1 of the accompanying drawings is a schematic plan view of such an optical card 101. Reference numeral 102 designates an information recording area, reference numeral 103 denotes an information track, reference numerals 104 and 104' designate track selection areas, and reference numeral 105 denotes the home position of a light spot. Reference numeral 106 designates an area in which a recording layer exists, and the home position 105 is included in this area.

Referring to FIG. 2 of the accompanying drawings, which is a block diagram showing an optical card information recording-reproducing apparatus according to the prior art, reference numeral 19 denotes an optical card information recording-reproducing apparatus (hereinafter referred to as the drive), and reference numeral 9 designates a CPU, which is a host control apparatus. The drive 19 is connected to the CPU 9 and executes recording and reproduction on the basis of a command issued from the CPU 9. The construction of the drive 19 is as follows. First, reference numeral 14 denotes a motor for introducing an optical card 1 into the drive 19 through a conveying mechanism, not shown, reciprocally moving the optical card 1 in the direction of arrow R at a predetermined location, and further ejecting the optical card outwardly of the drive 19. A sensor 50, for example, for optically detecting the optical card 1 is provided near the card insertion port (not shown) of the drive 19, and when the insertion of the optical card 1 is detected by the sensor 50, the optical card 1 is conveyed to a predetermined location in the drive, as previously described. Reference numeral 17 denotes a light beam applying optical system including a light source. During information recording and information reproduction, a light beam is applied from the light beam applying optical system 17 onto the optical card 1 and the light beam is reciprocally moved relative to the optical card 1 by the reciprocal movement of the optical card 1, and the light beam scans on the information track.

Reference numerals 28–30 designate photodetectors for receiving the reflected light of the light beam applied to the optical card 1, and recorded information is reproduced on the basis of the detection signals of these photodetectors. Reference numeral 15 denotes an AF actuator for driving a portion of the light beam applying optical system 17 to thereby move the focal position of the light beam spot on the surface of the optical card in the direction of arrow Z, i.e., the direction perpendicular to the surface of the optical card, and effect auto-focusing control, and reference numeral 16 designates an AT actuator for driving a portion of the light beam applying optical system 17 to thereby move the light beam spot on the surface of the optical card in a direction Y, i.e., a direction orthogonal to both of the direction R and the direction Z, and effect auto-tracking control. The light beam applying optical system 17, photodetectors 28–30, AF actuator 15 and AT actuator 16 are made integral with one another to constitute an optical head 18. Reference numeral 13 denotes a driving motor for moving this optical head 18 in the direction Y to thereby permit the light beam spot to have access to a desired track on the optical card 1.

Reference numeral 10 designates an MPU containing a ROM and a RAM therein. The MPU 10 controls various portions such as a card feeding motor 14 and a head feeding motor 13 and effects the communication and control of data with the CPU 9 under the control of the CPU 9. Reference numeral 11 denotes an AT/AF control circuit for driving the AF actuator 15 and the AT actuator 16 on the basis of the detection signals of the photodetectors 28–30 to thereby effect AF control and AT control. Reference numeral 12 designates a modulation-demodulation circuit for reproducing the detection signals of the photodetectors and demodulating the reproduced signals and reproducing them into original recording data. The thus obtained reproduced data are sent to the MPU 10, and are further transferred from the MPU 10 to the CPU 9. Also, during information recording, the recording data are sent from the MPU 10 to the modulation-demodulation circuit 12, in which the recording data are modulated by a predetermined modulation system. At this time, in the light beam applying optical system 17, the intensity of light of the semiconductor laser (not shown) of the light source is modulated in accordance with a modulation signal, and information by light modulation is recorded on the information track.

Reference numeral 71 denotes an encoder coupled to the driving motor 14. The encoder 71 outputs a pulse each time the driving motor 14 rotates by a predetermined angle. There is a predetermined relation between the angle of rotation of the driving motor 14 and the amount of movement of the optical card 1 in the direction R and therefore, by counting the output pulses of the encoder 71, the position of the light spot on the optical card 1 in the direction R can be detected. Reference numeral 72 designates a waveform shaping circuit for shaping the output pulses of the encoder 71 into a shape that can be received by the MPU 10. The CPU 9 instructs the drive 19 to record and reproduce the information of each sector, and in the drive 19, recording and reproduction are executed on the basis of these instructions.

FIG. 3 of the accompanying drawings is an exploded perspective view showing the internal construction of the optical head 18 in detail. In FIG. 3, reference numeral 20 denotes a light source for recording and reproduction such as a semiconductor laser. A light beam emitted from the light source is collimated by a collimator lens 21, whereafter it is divided into three light beams by a diffraction grating 23. These light beams are focused as light spots S1, S2 and S3 on the tracking track 37, the information track 39 and the tracking track 38, respectively, of the optical card 1 by an objective lens 26, as shown in FIG. 4 of the accompanying drawings.

The optical card 1 is reciprocally driven in the direction R indicated in FIG. 2, and the light spot and the optical card 1 are reciprocally moved relative to each other, whereby the light spot scans on the information track. The reflected lights of the light tracks S1, S2 and S3 again pass through the objective lens 26 and are reflected by a polarizing beam splitter 24, and are projected onto the photodetectors 28, 29 and 30, respectively, by a condensing lens system 27.

The condensing lens system 27 is an astigmatism system, and auto-focusing control by the astigmatism system is effected on the basis of the outputs of the photodetectors 28–30. FIG. 5 of the accompanying drawings shows the detecting surfaces of these photodetectors 28–30. The middle photodetectors 29 is a four-division sensor of which the detecting surface is divided into four detecting pieces A, B, C and D, and the photodetectors 28 and 30 on both sides thereof are ordinary sensors. Also, in FIG. 3, reference numeral 22 designates a prism for converting the cross-sectional distribution of the collimated light beam from an ellipse into a circle, and reference numeral 25 denotes a mirror for directing the light beam from the polarizing beam splitter 24 to the objective lens 26.

Referring now to FIG. 6 of the accompanying drawings which is a diagram for illustrating the control loops of auto-tracking control and auto-focusing control, reference numerals 28–30 designate the photodetectors shown in FIG. 3, and reference numeral 112 denotes a photoelectric converting part for converting the output currents of the photodetectors into electrical signals. Reference numeral 11 designates an AT/AF control circuit comprising a tracking control circuit 110 and a focusing control circuit 111. The photodetectors 28 and 30 detect light beams reflected from the tracking tracks 37 and 38 shown in FIG. 4, and the output currents of the photodetectors 28 and 30 are converted into voltage signals by current-voltage converters 5 and 6, respectively, in the photoelectric converting portion 112, and thereafter are sent to the tracking control circuit 110. In the tracking control circuit 110, the difference between said two output signals is taken, and that tracking error signal is applied to the AT actuator 16 shown in FIG. 2. That is, the AT actuator 16 is driven by the use of the tracking error signal having the tracking control loop from photodetectors 28 and 30 to the AT actuator 16 and indicative of the amount of deviation of the light spot relative to the track, and the objective lens 26 is moved in the tracking direction to thereby effect tracking control which causes the light spot to follow the information track.

The photodetector 29 is a four-division sensor as described in connection with FIG. 5, and the sum signal of the detecting pieces A and D thereof and the sum signal of the detecting pieces B and C thereof are converted into voltage signals by current-voltage converters 3 and 4, respectively, and thereafter are sent to the focusing control circuit 111. Here, the difference between the two signals is taken and is applied as a so-called focusing error signal to the AF actuator 15 shown in FIG. 2. Accordingly, the focusing control loop from the photodetector 29 to the AF actuator 15 is formed, and the AF actuator 15 is driven on the basis of the focusing error signal, whereby focusing control for focusing the light spot is effected.

The current-voltage converters 3–6 are designed such that two feedback resistors $R_R$ and $R_W$ are changed over by a switch Sw, and the feedback resistors $R_R$ and $R_W$ are changed over in conformity with a recording information signal output from the modulation-demodulation circuit 12. That is, during recording, the feedback resistors are changed over in conformity with the information signal to thereby changeover-control the gain in conformity with intensity-modulated recording light, and level control is effected so that the output of each current-voltage converter may become constant. When recorded information is to be reproduced, the light spot S2 of the three light spots shown in FIG. 4 scans the information track, and the reflected light thereof is detected by the four-division photodetector 29, whereby the recorded information is reproduced as the difference in the light intensity thereof. Although the photodetector 29 is of the four-division type, the sum total signal of the four detecting pieces thereof is used for reproduction.

Now, heretofore, the recording medium used in an information recording-reproducing apparatus has usually been limited to one kind. Therefore, the control gains of AF and AT and the reproduction gain are fixed values. Also, the driving of the semiconductor laser used as the light source is binary driving of recording power and reproduction power, and the injection current of the reproduction power and the injection current of the recording power are fixed, and these are changeover-controlled, whereby the semiconductor laser is driven.

On the other hand, there are known various information recording mediums usable in information recording-reproducing apparatuses, and for example, as a recording layer, mention may be made of metallic film such as tellurium or bismuth, organic film such as polystyrene or nitrocellulose, pigment film such as cyanin, or tellurium low oxide film utilizing phase transition. These recording materials are so-called DRAW (direct read after write) mediums which do not require the developing process after the recording of information, but permit "reading immediately after writing", and are capable of high density recording and additional recording.

However, these recording mediums are useful in their optical or chemical characteristic, but not all of them are useful when the combination thereof with an information recording-reproducing apparatus is considered. That is, as regards the optical characteristic of those recording mediums, they have a wavelength characteristic to light and even if light of the same wavelength is applied thereto, it may affect a servo control system or the like, which will thus not function normally, because they differ in reflectance. Also, the chemical characteristic will appear as a difference in reflectance because they differ in the degree of deformation or discoloration by heat. Thus, it is the present situation that the recording medium is restricted as previously described and apparatuses matching the characteristic of that medium are developed, and it has been the real situation that apparatuses cannot cope with various recording mediums.

Description will now specifically be made of the operation of an apparatus when a recording medium having other optical characteristic designated for that apparatus is set. It is to be understood that the reflectance of the recording medium is n times that of the designated recording medium. When such a recording medium is inserted into the apparatus, the quantity of light received by each photodetector becomes n times and therefore, as a matter of course, the level of each control signal subsequent to the current-voltage converter also becomes n times. However, each control gain of the apparatus is fixed and thus, each control sensitivity becomes n times. This will hereinafter be described in detail with reference to FIG. 7 of the accompanying drawings. FIG. 7 shows signals for AF AF control which are generally called S-shaped signals, signal A being the AF S-shaped signal of the recording medium designated for the apparatus, and signal B being the AF S-shaped signal of other recording medium having a reflectance of n times than the recording medium designated for the apparatus. The amplitude of the signal B is n times as great as the amplitude of the signal A because the reflectance is n times. As regards AF control, an AF actuator is controlled on the basis of this signal, but since the control gains are fixed as previously mentioned, the amount of movement of an objective lens of the signal B for the same voltage value is 1/n times the signal A, i.e., n times in terms of control sensitivity, and there occurs a phenomenon that focusing control does not function normally. Such a phenomenon occurs in an AT control system and a reproducing system as well. When a recording medium of different reflectance is thus set, control sensitivity varies, and this has led to the problem that stable AT control and AF control and reproduction become difficult and in the worst case, AT and AF are not applied at all. Also, the fact that access cannot be conducted to other recording mediums than the designated one means that the versatility as a system is spoiled, and it has been desired to solve this problem.

SUMMARY OF THE INVENTION

The present invention has been made in order to solve such problems and the object thereof is to eliminate the limitations in the use of a card-like optical recording medium and to provide an optical information recording-reproducing apparatus and method which have compatibility with other apparatuses irrespective of the kind of the card-like optical recording medium.

The above object is achieved by an optical information recording-reproducing apparatus for applying a light beam to an optical information recording medium to thereby record information or reproduce the recorded information, characterized by the provision of detecting means for detecting the reflected light of the light applied to a predetermined location on the recording medium and detecting the reflectance of the recording medium, and control means for varying the gains of a signal reproducing system, a tracking control system and a focusing control system in conformity with the result of the detection by the detecting means, and controlling a reproduction signal level, a tracking error signal level and a focusing error signal level to predetermined respective levels.

Also, the above object is achieved by an optical information recording-reproducing apparatus for applying a light beam to an optical information recording medium to thereby record information or reproduce the recorded information, characterized by the provision of detecting means for detecting the reflected light of the light applied to a predetermined location on the recording medium and detecting the reflectance of the recording medium, and control means for varying the reproduction light power of a light source in conformity with the result of the detection by the detecting means, and controlling a reproduction signal level, a tracking error signal level and a focusing error signal level to predetermined respective levels.

The invention will hereinafter be described in greater detail with respect to some embodiments thereof.

DETAILED DESCRIPTION OF THE PREFERRED EMBODIMENTS

Figure 8:
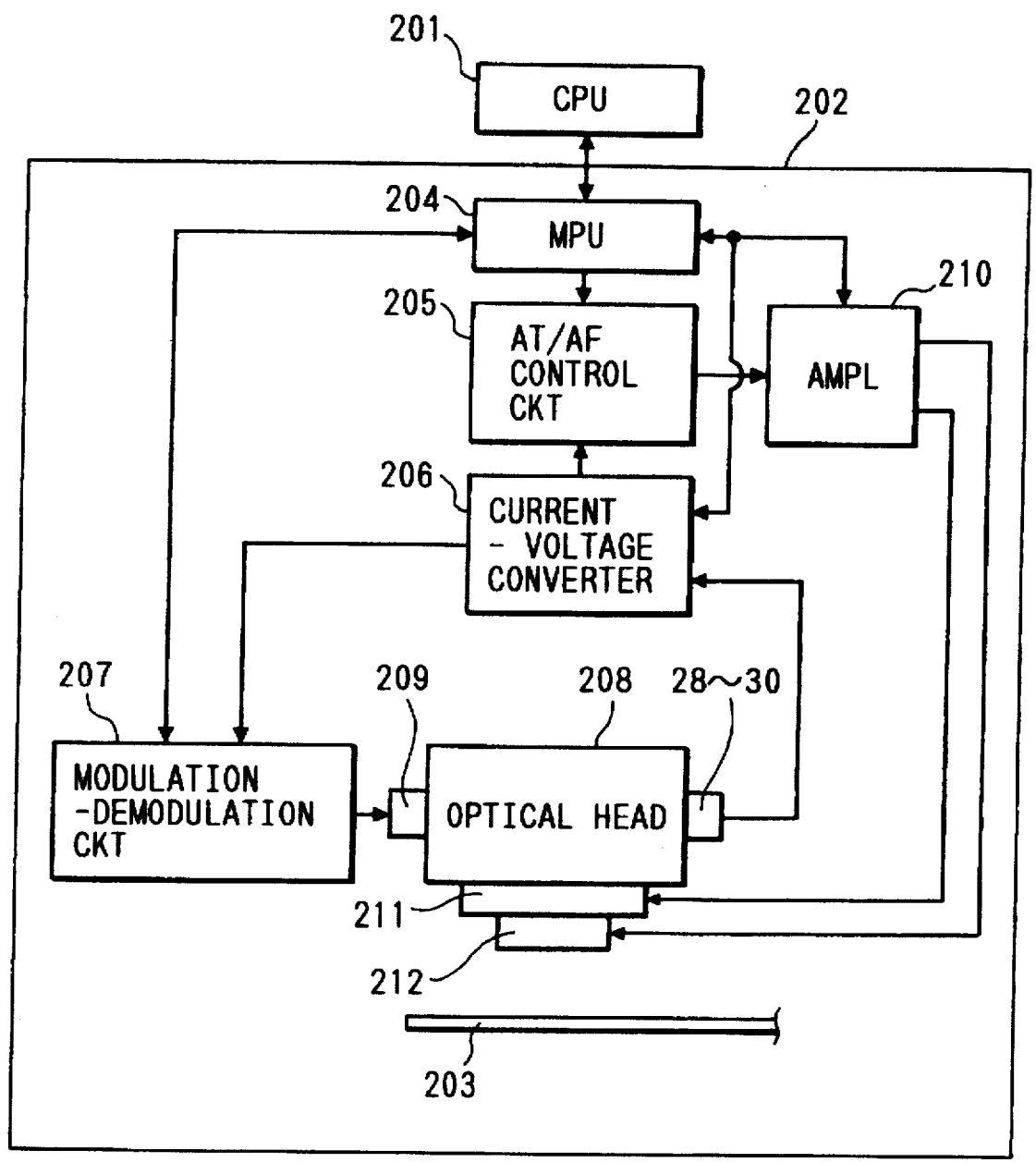
FIG. 8 is a block diagram showing an embodiment of the optical information recording-reproducing apparatus of the present invention.

Some embodiments of the present invention will hereinafter be described in detail with reference to the drawings. FIG. 8 is a block diagram showing an embodiment of the optical information recording-reproducing apparatus of the present invention. In FIG. 8, reference numeral 201 designates a CPU which is a host control apparatus, and reference numeral 202 denotes an optical information recording-reproducing apparatus connected to the CPU 201. Reference numeral 203 designates an optical card which is an information recording medium, reference numeral 204 denotes an MPU for controlling various portions in the information recording-reproducing apparatus and effecting the transmission and reception of data with the CPU 201, reference numeral 205 designates an AT/AF control circuit for effecting auto-tracking control and auto-focusing control and reference numeral 206 denotes a current-voltage converter for converting the detection signal of a photodetector 29 into a voltage signal. The current voltage converter 206 is used as gain correcting means for adjusting the gain thereof on the basis of the instructions of the MPU 204 to thereby correct the gain so that a reproduction signal level, a tracking error signal level and a focusing error signal level may be predetermined respective levels. The correction by this current-voltage converter 206 is effected in conformity with the kind of the optical card, and will be described later in detail. Reference numeral 207 designates a modulation-demodulation circuit for modulating recording data transmitted from the CPU 201 by a predetermined modulation system and demodulating a reproduction signal to thereby produce reproduction data, and reference numeral 208 denotes an optical head for applying a light beam for recording or reproduction to the optical card 203 and detecting the reflected light thereof.

Figure 3:
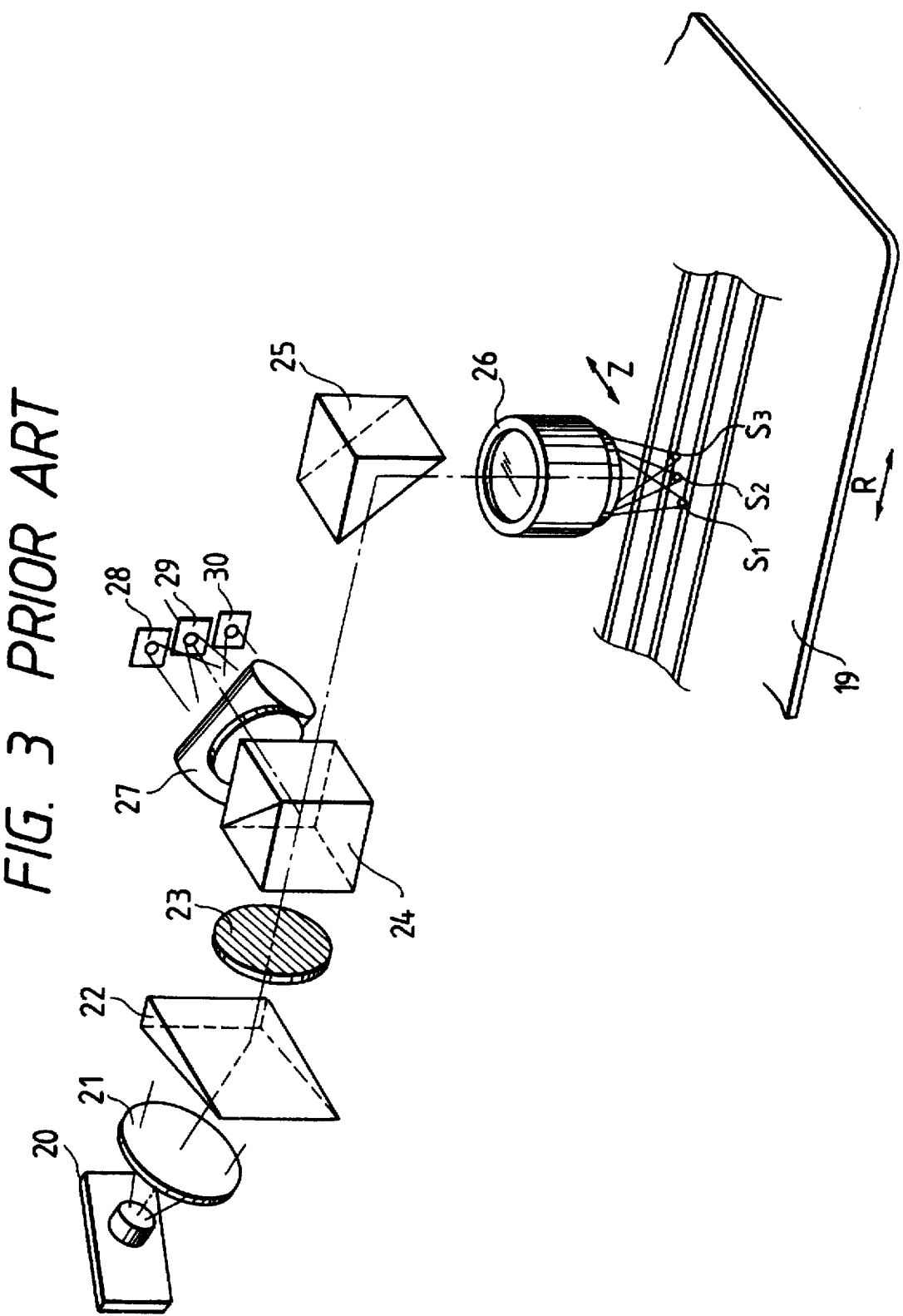
FIG. 3 shows the details of an optical head shown in FIG. 2.

The construction of the optical head 208 is the same as that shown in FIG. 3. Reference numeral 209 designates a semiconductor laser provided as a light source in the optical head 208, and reference numerals 28–30 denote photodetectors. These photodetectors are the same as those shown in FIG. 5, the photodetector 29 being a four-division photodetector, and the photodetectors 28 and 30 being ordinary photodetectors provided on both sides thereof. Reference numeral 210 designates an amplifier for amplifying a tracking error signal and a focusing error signal output from the AT/AF control circuit 205. Usually, the gain of the amplifier 210 is fixed at a predetermined gain, but with regard to the aforementioned tracking error signal, the gain of the amplifier 210 instead of the gain of the current-voltage converter 206 may be varied and thereby corrected so that the output level thereof may become constant. Reference numeral 211 denotes an AT actuator driven by the output of the amplifier 210, and reference numeral 212 designates an AF actuator.

The operation of the present embodiment will now be described. In the present embodiment, a reference optical card is designated and the reproduction power of the semiconductor laser 209, the gain of the current-voltage converter 206 and the gain of the AT/AF control circuit 205 are initially set in accordance with the optical characteristic of the reference optical card. The reproduction power and recording power are determined by the optical characteristic and chemical characteristic of the designated reference optical card and are initially fixed. The gain of the amplifier 210 is also initially fixed.

Figure 1:
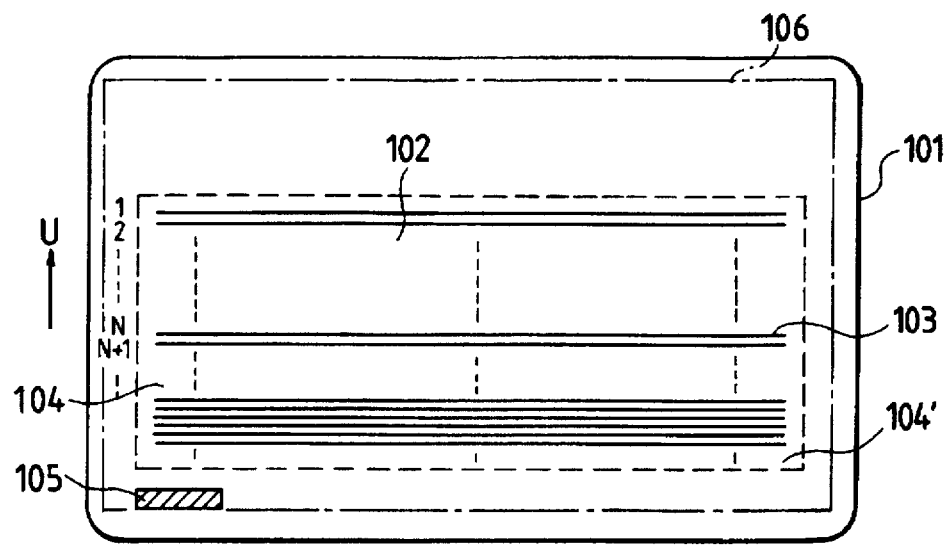
FIG. 1 is a top plan view of a conventional optical card.
Figure 4:
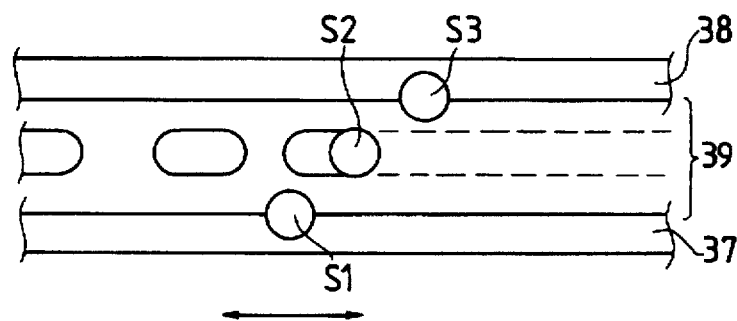
FIG. 4 shows tracks on the optical card and light spots applied thereto.
Figure 9:
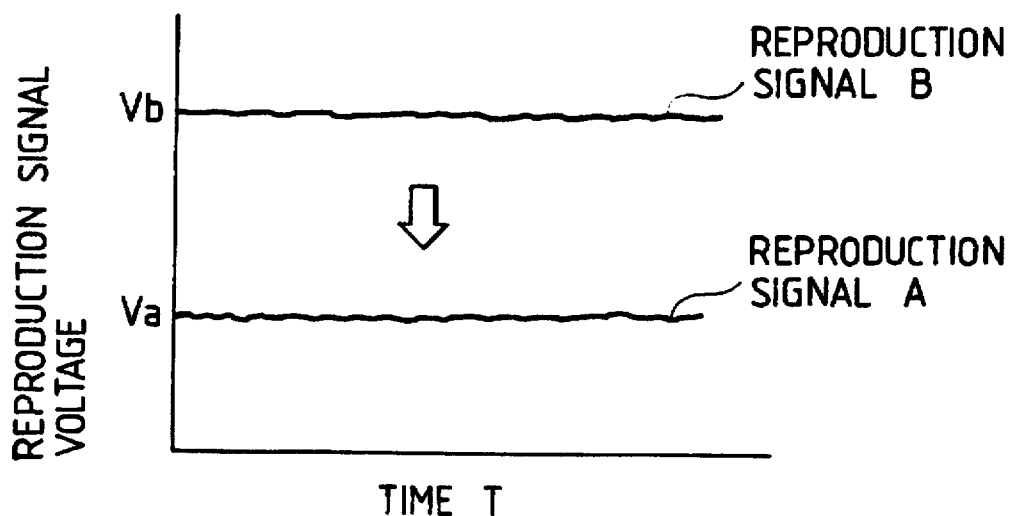
FIG. 9 shows the variations in the levels of reproduction signals by the difference in the reflectance of an optical card.

When the optical card 203 is set in the apparatus, the MPU 204 controls various portions and moves the light beam of the optical head 208 to the home position of the optical card 203. The home position is provided at a location off the recording area as described in connection with FIG. 1, but the reflectance is the same as that of the recording area because there is a recording layer. The MPU 204 then sets the light output of the semiconductor laser 209 to the reproduction power and a light beam is applied to the home position (a predetermined position) and at this time, AF lead-in for focusing is effected by the work of the AT/AF control circuit 205. This light beam is reflected at the home position, and the reflected light is detected by the photodetectors 28–30. The detection signal of the four-division photodetector 29 of the photodetectors 28–30 is output to the current-voltage converter 206 and is converted into a voltage signal thereby. Of course, the photodetector 29 is of the four-division type and therefore, the sum total signal thereof is converted into a voltage signal. FIG. 9 shows reproduction signals output from the current-voltage converter 206, and a reproduction signal A indicates the reproduction signal of the reference optical card designated as previously described, and a reproduction signal B indicates the reproduction signal of the optical card set now. The signal level of the reproduction signal A of the reference optical card is $V_a$, and the signal level of the reproduction signal B of the optical card set now is $V_b$.

In the MPU 204, the output signal of the current-voltage converter 206 is introduced and the level thereof is measured and compared with the reference reproduction signal level. In this case, the relation between the reference reproduction signal level $V_a$ and the measured reproduction signal level $V_b$ is expressed by the following equation:

$$V_a \cdot V_b = (S_i \times G_i) : (S \times G_i) = S_i \cdot S \tag{1}$$

where $S_i$ is the output level of the photodetector 29 when the reference optical card is set, S is the output level of the photodetector to the optical card set now, and $G_i$ is the gain of the current-voltage converter 206 initially set as previously described. The MPU 204 calculates the constant G to be corrected from the following equation (2) on the basis of equation (1):

$$G = (V_a/V_b) \times G_i \tag{2}$$

The MPU 204 controls the gain of the current-voltage converter 206 on the basis of the obtained correction coefficient and makes a gain G $V_a/V_b$ times the original fixed gain $G_i$, thereby correcting the signal levels of the reproduction signal of the current-voltage converter 206, the tracking error signal and the focusing error signal. As a result, the signal levels of the reproduction signal, the tracking error signal and the focusing error signal become the same as the signal levels of the reference optical card and are controlled to a predetermined level irrespective of the optical characteristic and chemical characteristic of the optical card.

Figure 10:
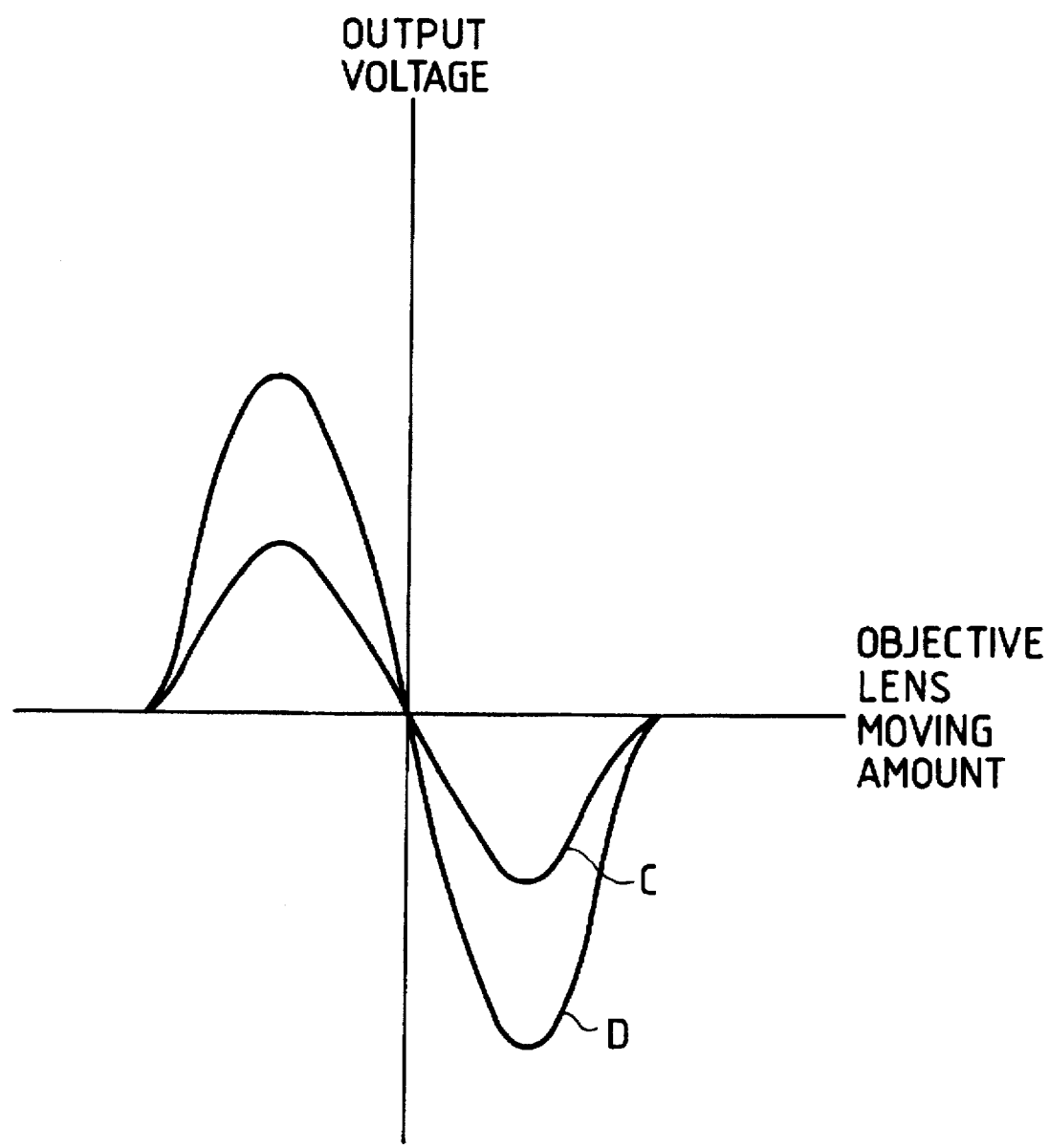
FIG. 10 shows the variation in a focusing error signal level by the difference in the reflectance of the optical card.

FIG. 10 shows the focusing error signals of the AT/AF control circuit 205 as an example. The letter C indicates the focusing error signal of the reference optical card, and the letter D indicates the focusing error signal of an optical card differing in reflectance from the reference optical card. The difference in reflectance between the optical cards appears as a difference in signal level as shown in FIG. 10, but by the gain of the focusing control system of the current-voltage converter 206 being corrected as previously described, the focusing error signal assumes the level of the signal C and the difference in signal level by the difference in reflectance can be corrected. In FIG. 10, only the focusing error signals are shown, but the tracking error signal is just likewise controlled to a predetermined level. The focusing error signal is a signal obtained by adding the detection signals of the detecting pieces at the diagonal positions of the four-division photodetector 29 shown in FIG. 5, and taking the difference between the obtained addition signals. That is, it is a signal obtained by the calculation of [(A+D)−(B+C)].

Figure 11:
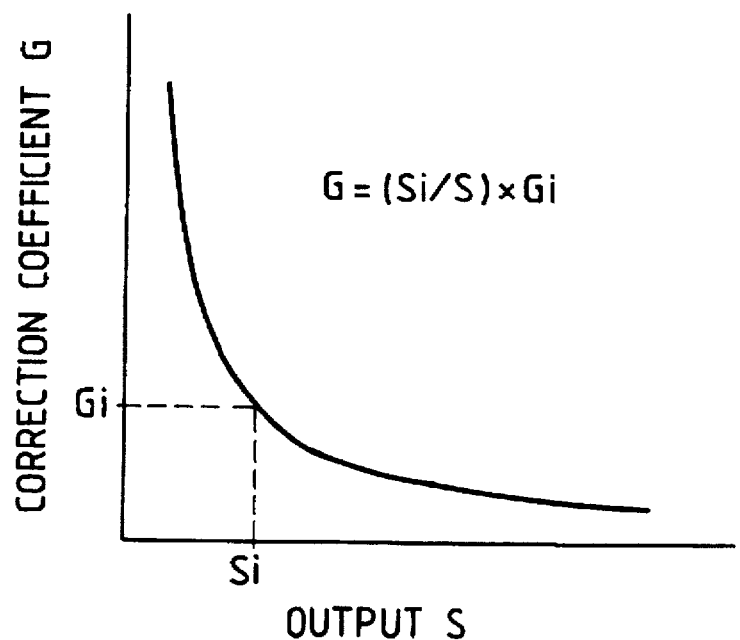
FIG. 11 is a graph showing the relation between the output of a photodetector and a correction coefficient.

FIG. 11 is a graph showing the relation between the output S of the photodetector and the correction coefficient G. As is apparent from FIG. 11, the higher becomes the reflectance of the optical card, the greater becomes the output S of the photodetector, and the correction coefficient G becomes correspondingly smaller. $G_i$ is the reference gain, and $S_i$ is the then output of the photodetector. Like this, the correction coefficient G changes in conformity with a variation in the output of the photodetector, but by adjusting the gain of the current-voltage converter 206 by a correction coefficient G conforming to the optical characteristic (reflectance) of the optical card, the recording and reproduction of information can be effected whatever optical characteristic the optical card may have.

Figure 6:
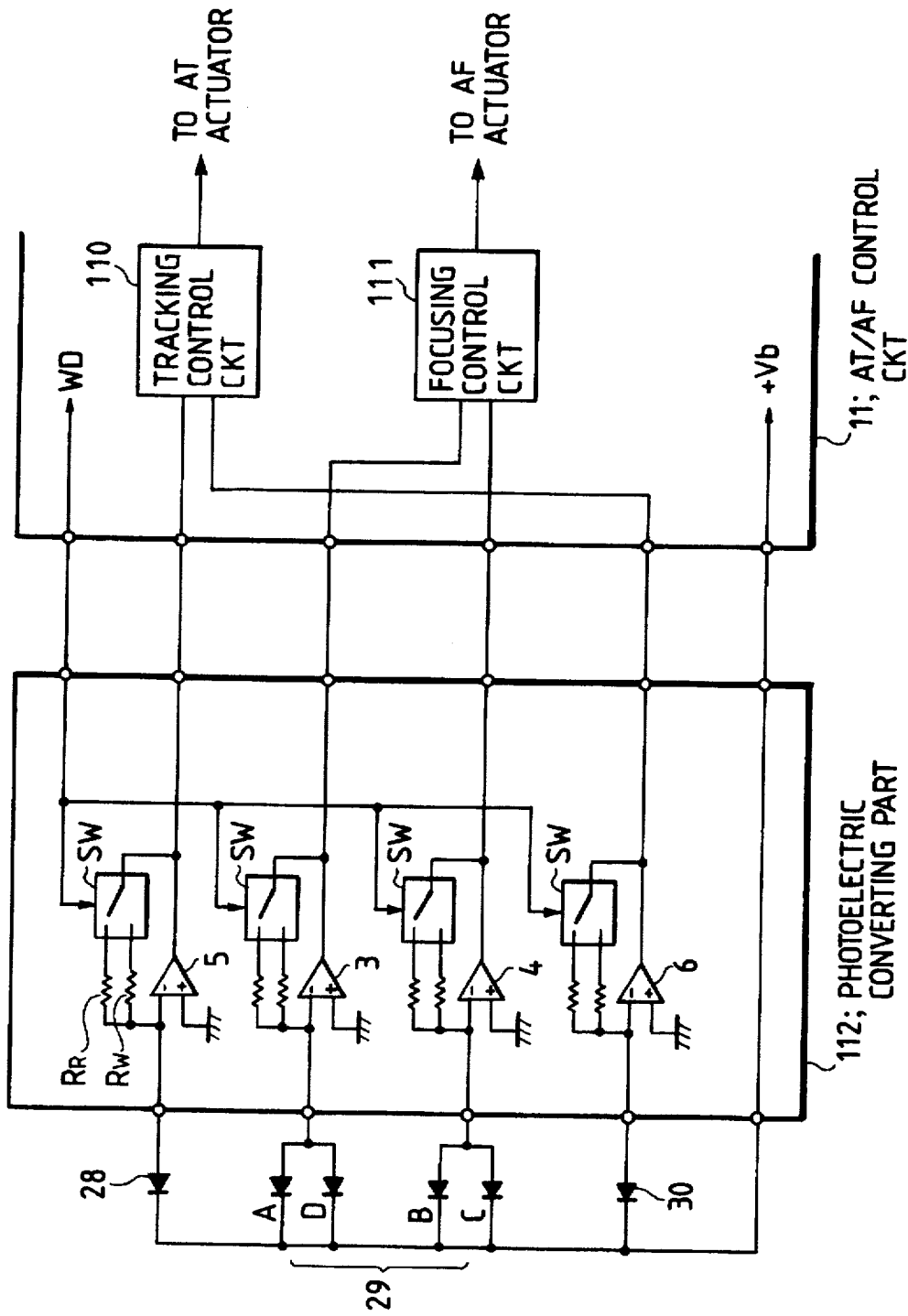
FIG. 6 illustrates the control loops of tracking control and focusing control in the apparatus shown in FIG. 2.
Figure 7:
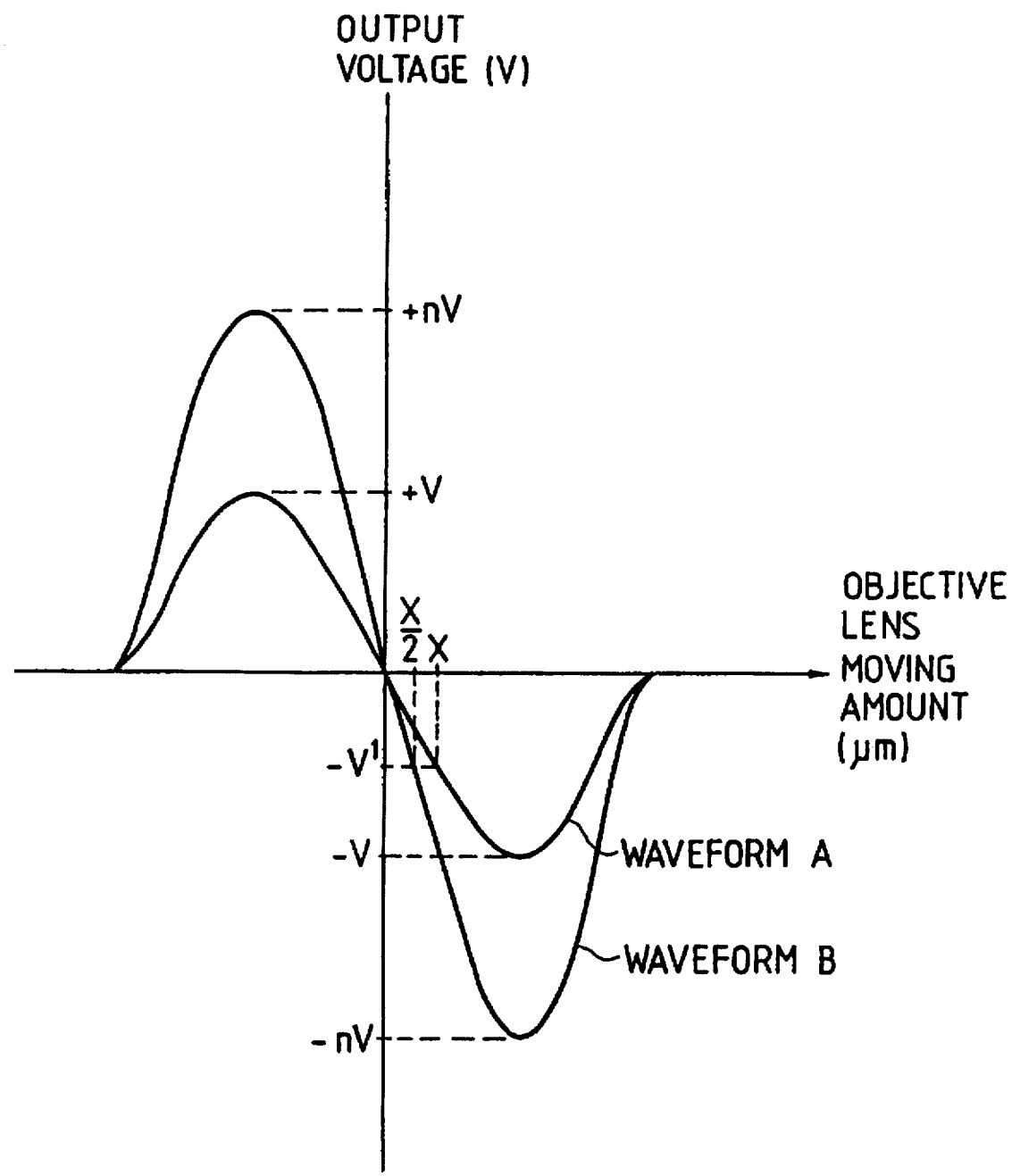
FIG. 7 shows S-shaped signals for focusing control corresponding to the two reflectances of the optical card.

The current-voltage converter 206 is comprised of an amplifier and a feedback resistor as shown in FIG. 6, and in the present embodiment, there are provided a greater number of feedback resistors differing in resistance value. These feedback resistors are changed over by a switch and the MPU 204 selects a feedback resistor in accordance with the obtained correction coefficient G. As the feedback resistors, there are provided a plurality of feedback resistors of a resistance value conforming to the reflectance of the optical card correspondingly to the kind of the latter. That is, the optical cards used are known in advance and the reflectances thereof are substantially determined by the recording material and the manufacturing method and therefore, design is made such that feedback resistors of plural resistance values are provided correspondingly to the reflectances of the optical cards and are changed over in conformity with the reflectances of the optical cards by the use of a switch. Accordingly, the MPU 204 selects a feedback resistor corresponding to each converting portion in accordance with the correction coefficient G obtained by the MPU 204, whereby the gain of the current-voltage converter 206 can be corrected to thereby control the reproduction signal level, the tracking error signal level and the focusing error signal level to predetermined constant levels, respectively.

Also, by the gain of the amplifier 210 being varied as previously described, the focusing error signal can be controlled to a predetermined level. The current-voltage converter 206 and amplifier 210 may be ones having the automatic gain controller (AGC) function, and in that case, continuous adjustment of the gain is possible and therefore, not only a predetermined optical card but also various optical cards can be coped with, and even in one kind of optical cards, the fine adjustment of the gain is possible for any irregularity of reflectance occurring in the manufacture and therefore, the reproduction signal, the tracking error signal and the focusing error signal can be corrected more accurately.

Thus, in the present embodiment, the control gains of the reproduction circuit, the tracking control circuit and the focusing control circuit are corrected in conformity with the reflectance of the optical card, whereby the reproduction signal, the tracking error signal and the focusing error signal can be controlled to predetermined respective levels. Accordingly, the difference in reflectance by the difference in the optical and chemical characteristics of the optical card can be effectively compensated for, and the compatibility with the apparatus can be ensured irrespective of the kind of the optical card. Consequently, the limitation in use as in the prior art that the kind of the optical card is limited to one is eliminated, and the problem that the versatility as a system is spoiled can be solved. In the present embodiment, the applied position of the light beam to the optical card is defined as the home position, but there is no problem in any other position than the home position if it is an area in which there is the recording layer and information is not yet recorded. Besides, any portion of the recording area in which information is not yet recorded will also do.

The reason why any area in which information has already been recorded will not do is that whether the variation in reflectance is due to recorded information or to the difference in the kind of the medium cannot be distinguished.

Also, in the region wherein the tracking tracks exist, it is desirable that AT control be effected.

Figure 12:
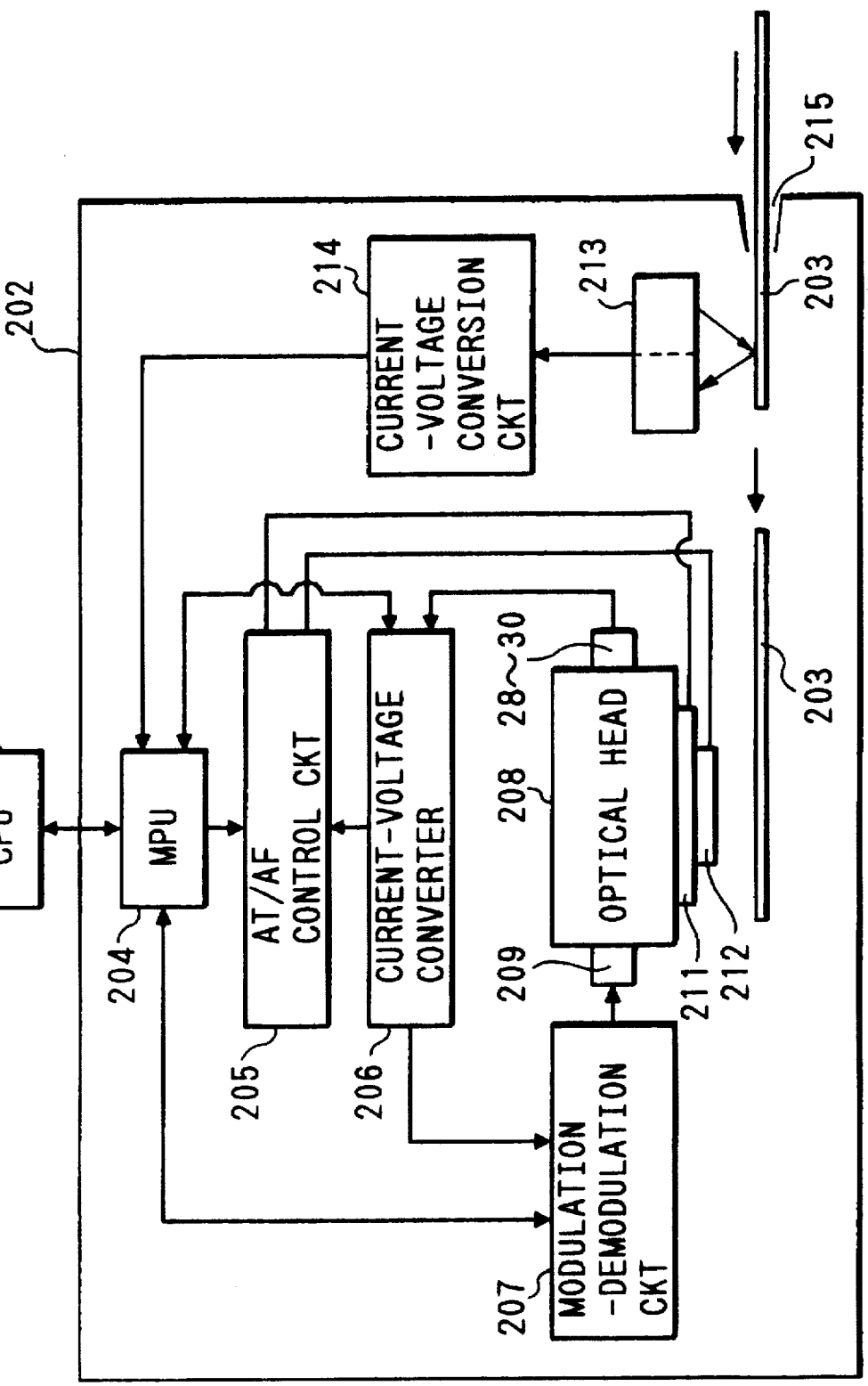
FIG. 12 is a block diagram showing another embodiment of the present invention.

FIG. 12 is a block diagram showing another embodiment of the present invention. In the embodiment of FIG. 8, the kind of the optical card, i.e., the reflectance thereof, is detected by the use of the semiconductor laser and photo-detectors of the optical head, while this embodiment is one in which provision is made of detecting means exclusively for that detection. In the present embodiment, the amplifier 210 shown in FIG. 8 is not provided and the levels of the reproduction signal, the tracking error signal and the focusing error signal are controlled to predetermined respective levels by the utilization of the feedback resistors of the current-voltage converter 206. In FIG. 12, reference numeral 213 designates a photodetector provided near an insertion port 215 for the optical card. Specifically, this photodetector 213 is comprised of a pair of optical elements, i.e., a light emitting diode which is a light emitting element and a photodiode which is a light receiving element. The irradiating position of the light emitting diode is fixed at the home position of the optical card, and when the optical card is inserted into the insertion port 215, light emitted from the light emitting diode is reflected at the home position and the reflected light thereof is detected by the photodiode. The detection signal of the photodiode is photoelectrically converted by a current-voltage conversion circuit 214, whereafter it is sent as a voltage signal to the MPU 204. The reflectance detecting operation is performed when the optical card 203 is passing, and the optical card 203 is conveyed to a predetermined position while its reflectance is detected.

The MPU 204, just as in the embodiment of FIG. 8, changes over the feedback resistors of the current-voltage converter 206 on the basis of the reflectance information obtained by the photodetector 213 and controls the level of the reproduction signal to a predetermined level. Also, the MPU 204 changes over the feedback resistors in the current-voltage converter 206 in conformity with the reflectance information and controls the tracking error signal and the focusing error signal to predetermined respective levels. Thus, the gain of the current-voltage converter 206 is adjusted in conformity with the reflectance, and the reproduction signal level, the tracking error signal level and the focusing error signal level are controlled to predetermined levels irrespective of the kind of the optical card. Again in the present embodiment, just as in the embodiment of FIG. 8, the compatibility with the apparatus can be ensured irrespective of the kind of the optical card and the versatility as a system can be enhanced.

Figure 13:
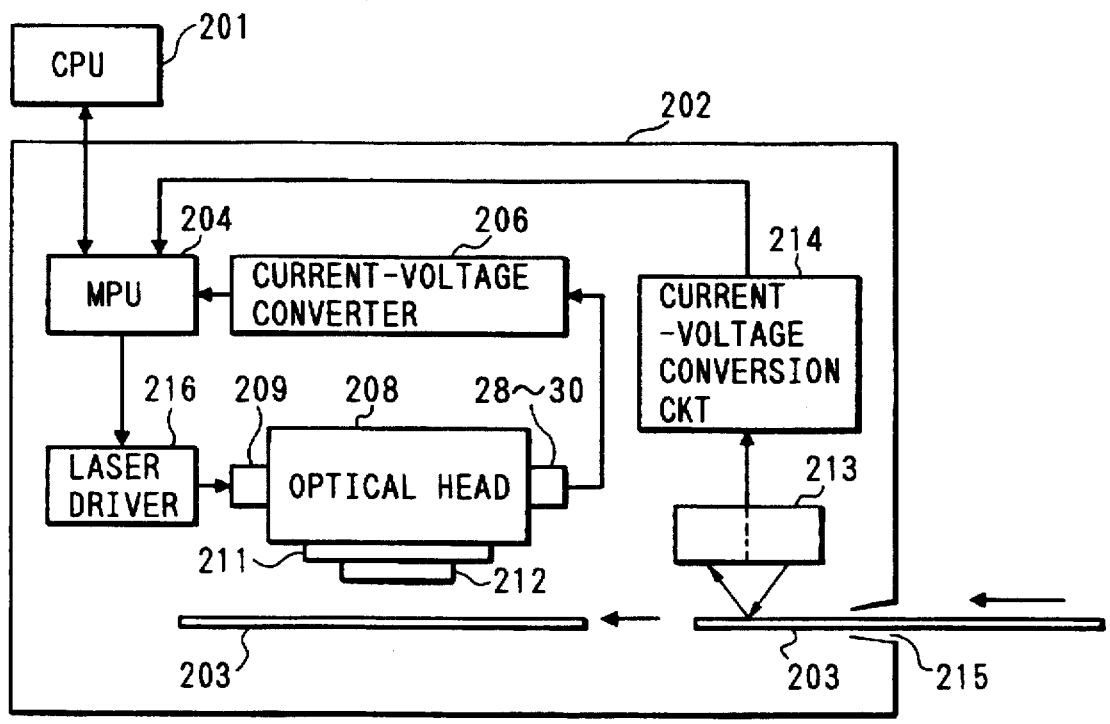
FIG. 13 is a block diagram showing still another embodiment of the present invention.

FIG. 13 is a block diagram showing still another embodiment of the present invention. In the embodiments of FIGS. 8 and 12, the gains of the current-voltage converter and amplifier are varied to thereby control the levels of the reproduction signal, the tracking error signal and the focusing error signal, while this embodiment is one in which the light output of the semiconductor laser of the light source is controlled in conformity with the reflectance of the optical card. In FIG. 13, reference numeral 216 designates a laser driver for driving a semiconductor laser 209 on the basis of the instructions of the MPU 204. When information is to be recorded, this laser driver 216 modulates the intensity of light of the semiconductor laser 209 by a predetermined modulation system and this intensity-modulated light beam is scanned on the information track of the optical card 203, whereby information is recorded. Also, when the information is to be reproduced, the laser driver 216 drives the light output of the semiconductor laser 209 by predetermined reproduction power, and a light beam of this reproduction power is scanned on the information track, whereby the information is reproduced. The reproduction power of the semiconductor laser 209 is initially set in accordance with the reference optical card, whereafter it is controlled in conformity with the reflectance of the optical card as previously described.

Figure 14:
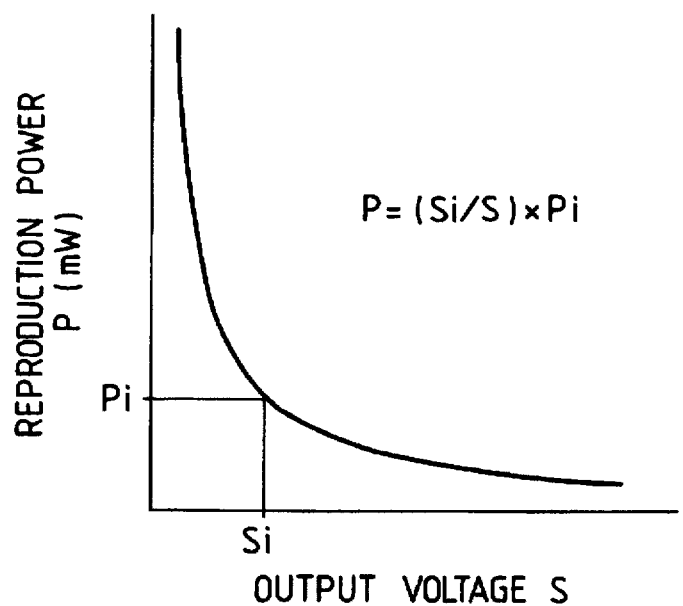
FIG. 14 is a graph showing the relation between the voltage of a reproduction signal and the reproduction power of a semiconductor laser.

The reflectance of the optical card is detected by a photodetector 213 provided near an insertion port 215 for the optical card as in the embodiment of FIG. 12. The reflectance information of the photodetector 213 is sent to the MPU 204, which thus controls the laser driver 216 on the basis of the reflectance information. FIG. 14 is a graph showing the relation between the output voltage S of the reproduction signal of the current-voltage converter 206 and the reproduction power P of the semiconductor laser 209. The reproduction signal level depends on the reproduction power P of the semiconductor laser 209, and the higher becomes the reproduction power P, the greater becomes the reproduction signal level. In FIG. 14, $P_i$ is reproduction power corresponding to the initially set reference optical card and $S_i$ is a reproduction signal level corresponding to that reference optical card. In FIG. 14, there is shown the relation between the reproduction power and the reproduction signal level, and there is a similar relation between the reproduction power and the tracking error signal and between the reproduction power and the focusing error signal. So, the MPU 204 calculates the injection current to the semiconductor laser 209 so that the reproduction power P of the semiconductor laser 209 may be $(S_i/S) \times P_i$ on the basis of the sent reflectance information, and controls the laser driver 216 on the basis of the obtained value. S is the reproduction signal level of the set optical card.

Figure 15:
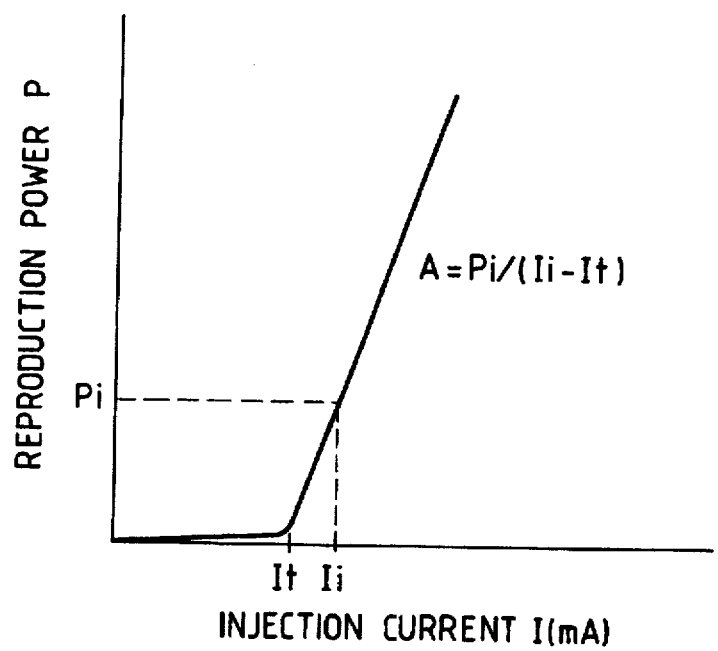
FIG. 15 is a graph showing the relation between the injection current and reproduction power of the semiconductor laser.

FIG. 15 is a graph showing the injection current I and the reproduction power P of the semiconductor laser 209. When the threshold current of the semiconductor laser is $I_t$ and an injection current corresponding to the initially set power is $I_i$, the injection current I can be given by $$I = I_t + (P - P_i)/A, \tag{3}$$

where A is defined by the following equation:

$$A = P_i/(I_i - I_t) \tag{4}$$

Thus, the MPU 204 calculates the current to be injected into the semiconductor laser 209 in conformity with the reflectance of the optical card, and controls the laser driver 216 on the basis of the obtained value. Thereby, a driving current conforming to the reflectance of the optical card is supplied to the semiconductor laser 209 and the level of the reproduction signal output from the current-voltage converter 206 is controlled to the reference level $S_i$ shown in FIG. 14. Likewise, the tracking error signal and focusing error signal of the current-voltage converter 206 are also controlled to predetermined reference levels. Such adjustment of the light output of the semiconductor laser 209 is effected while the optical card 203 is conveyed to a predetermined position in the apparatus after the reflectance thereof is detected. Thus, again in the present embodiment, by the reproduction power of the semiconductor laser being varied in conformity with the reflectance of the optical card, the reproduction signal level, the tracking error signal level and the focusing error signal level can be controlled to predetermined respective levels irrespective of the reflectance of the optical card.

Figure 16:
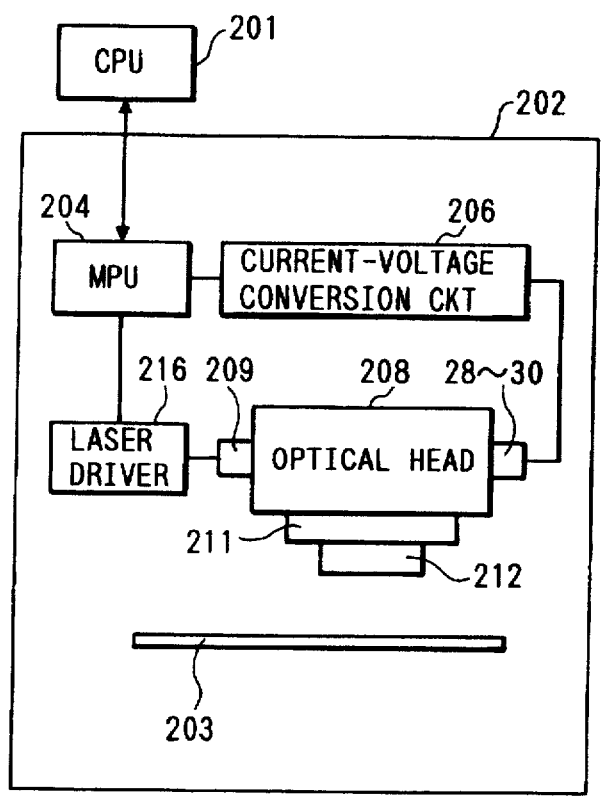
FIG. 16 is a block diagram showing yet still another embodiment of the present invention.

FIG. 16 is a block diagram showing yet still another embodiment of the present invention. In the embodiment of FIG. 12, the reflectance of the optical card is detected by the photodetector provided near the insertion port for the optical card and the laser driver is controlled on the basis of the detected information, while in the present embodiment, the reflectance of the optical card is detected by the photodetector of the optical head and the laser driver is controlled on the basis of the detected information.

In the following description, members functionally similar to those in the previous embodiment are given similar reference numerals and need not be described.

The semiconductor laser power control method in the present embodiment will hereinafter be described with reference to FIG. 16.

A designated optical card 203 is first inserted into an optical information recording-reproducing apparatus 202. Immediately after the insertion of the optical card 203, a laser driver 216 injects a current into a semiconductor laser 209 so that the semiconductor laser may emit initially set reproduction power $P_i$. The reproduction light of the initially set power $P_i$ is applied to the optical card 203 by an optical head 208. It is to be understood that the applied position of the light at this time is the home position 105 of the other area in which information is not recorded than the recording area 102 of the optical card shown in FIG. 1.

Figure 5:
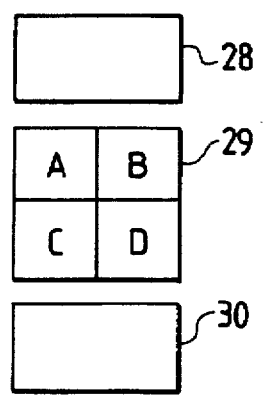
FIG. 5 shows the details of photodetectors shown in FIG. 3.
Figure 2:
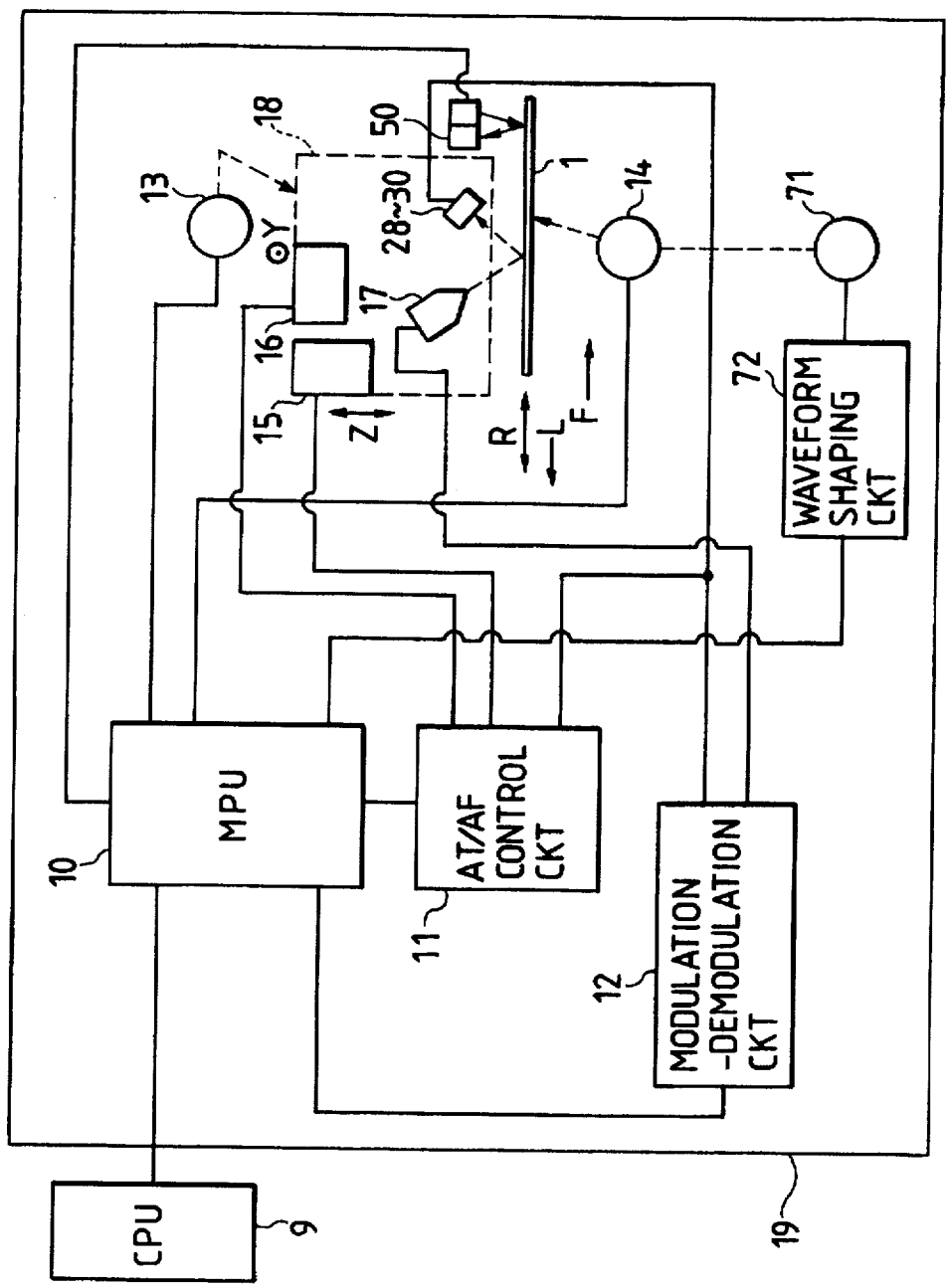
FIG. 2 is a block diagram showing a conventional optical information recording-reproducing apparatus.

The light is decreased to a quantity of light in conforamce with the reflectance of the designated optical card 203 and is received by sensors 28–30. The output currents of the sensors 28–30 are converted into voltages by the current-voltage converter 206 and AF control is effected on the basis thereof. AT control at the home position in which there is no tracking track is not effected. In the optical information recording-reproducing apparatus, the three-beam system and the astigmatism system are used for AT control and AF control, respectively. The sensors 28–30 are the same in construction as the sensors of FIG. 5 shown in the prior art.

The output voltage level from the current-voltage converter 206 is judged by the MPU 204. In this case, it is judged to be the voltage level from the optical card designated for the apparatus, and the "injection current amount change command" from the MPU 204 to the laser driver 210 is not effected and therefore, the light emission power of the semiconductor laser 209 remains to be the initially set power $P_i$. It is to be understood that the voltage level from the designated optical card is $S_i$.

Description will now be made of a case where an optical card 203' having a reflectance differing from that of the designated optical card has been inserted into the optical information recording-reproducing apparatus 202.

Immediately after the optical card 203' has been inserted into the apparatus, the laser driver 216 injects a current into the semiconductor laser 209 so that the reproduction power of the laser may become the initially set power $P_i$. AF is drawn in by a process similar to that when the designated optical card 203 has been inserted. The output voltage level from the current-voltage converter 206 at this time is S.

In the MPU 204, the voltage level S is compared with the voltage level $S_i$ when the reproduction power is the initially set power $P_i$, and the injection current amount I into the semiconductor laser 209 is calculated so that the set power P in the semiconductor laser 209 may become $P = (S_i/S) \times P_i$. The injection current amount I can be found from the relation between I (injection current) and P (reproduction power) of the semiconductor laser shown in FIG. 15. That is, when the threshold current of the semiconductor laser is $I_t$ and the injection current when the reproduction power is the initially set power is $I_i$, $$I = I_t + (P - P_i)/A,$$

where $A = P_i/(I_i - I_t)$. On the basis of this, the MPU 204 effects the "injection current change command" to the laser driver 216, which thus drives the semiconductor laser 209 by the injection current I. The relation at this time between the output voltage S of the current-voltage converter 206 and the set power P is as shown in FIG. 14.

What is claimed is:

1. An optical information recording-reproducing apparatus in which a light beam is applied to a card-like optical information recording medium while effecting tracking control and focusing control to thereby effect at least one of recording and reproduction of information on and from a recording region on a recording layer formed on the medium, comprising:

means for applying a light beam to a designated region other than the recording region on the recording layer of the recording medium, no information being recorded on the designated region;

means for detecting a light quantity of reflected light caused by application of the light beam by said light beam applying means; and means for adjusting the power of said light beam applied by said applying means in accordance with a result of the detection in the region by said detecting means so as to compensate for a difference between the detected light quantity of the reflected light and a reference light quantity.

2. An optical information recording-reproducing apparatus according to claim 1, further including a light source of said light beam and wherein said light applying means is common to said light source.

3. An optical information recording-reproducing apparatus according to claim 2, further including a photodetector for detecting the reflected light of said light beam and wherein said reflected light detecting means is common to said photodetector.

4. An optical information recording-reproducing apparatus according to claim 1, wherein said light applying means and said reflected light detecting means are provided near the insertion port of said apparatus.

5. An optical information recording-reproducing method in which a light beam is applied to a card-like optical information recording medium while effecting tracking control and focusing control to thereby effect at least one of recording and reproduction of information on and from a recording region on a recording layer formed on the medium, said method comprising the steps of:

applying a light beam to a designated region other than the recording region on the recording layer of the recording medium, no information being recorded on the designated region;

detecting a light quantity of reflected light caused by application of the light beam in said light beam applying step; and adjusting the power of the light beam applied in said applying step in accordance with a result of the detection in the region by said detecting step so as to compensate for a difference between the detected light quantity of the reflected light and a reference light quantity.

6. An optical information recording-reproducing method according to claim 5, wherein the adjustment of the power of said light beam is effected in order that said tracking control and said focusing control may be effected stably even for a recording medium of different reflectance.

7. An optical information recording-reproducing apparatus in which a light beam is applied to a card-like optical information recording medium while effecting tracking control and focusing control to thereby effect at least one of recording and reproduction of information on and from a recording region on a recording layer formed on the medium, comprising:

means for applying a light beam to a designated region other than the recording region on the recording layer of the recording medium, no information being recorded on the designated region;

means for detecting reflected light caused by application of the light beam by said light beam applying means; and means for adjusting the power of said light beam applied by said applying means in accordance with a result of the detection in the region by said detecting means, adjusted to account for a difference in reflectance of said recording medium from a designated recording medium.

8. An optical information recording-reproducing method in which a light beam is applied to a card-like optical information recording medium while effecting tracking control and focusing control to thereby effect at least one of recording and reproduction of information on and from a recording region on a recording layer formed on said recording medium, said method comprising the steps of:

applying a light beam to a designated region other than the recording region on the recording layer of the recording medium, no information being recorded on the designated region;

detecting reflected light caused by application of the light beam in said light beam applying step; and adjusting the power of the light beam applied in said applying step in accordance with a result of the detection in the region by said detecting step, adjusted to account for a difference in reflectance of said recording medium from a designated recording medium.

* * * * *

UNITED STATES PATENT AND TRADEMARK OFFICE
CERTIFICATE OF CORRECTION

PATENT NO. : 5,680,382           Page 1 of 2
DATED      : October 21, 1997
INVENTOR(S) : Inoue It is certified that error appears in the above-identified patent and that said Letters Patent is hereby corrected as shown below:

COLUMN 1:

Line 27, "to" should be deleted.

COLUMN 3:

Line 29, "photodetectors" should read --photodetector--.

COLUMN 5:

Line 1, "characteristic" should read --characteristics--,
        and "is" should read --are--;
   Line 12, "AF" (second occurrence) should be deleted;
   Line 16, "other" should read --another--; and
   Line 17, "than" should read --that of--.

COLUMN 6:

Line 44, "still" should be deleted.

COLUMN 11:

Line 59, "still" should be deleted.

UNITED STATES PATENT AND TRADEMARK OFFICE
CERTIFICATE OF CORRECTION

PATENT NO. : 5,680,382
DATED : October 21, 1997
INVENTOR(S) : Inoue

It is certified that error appears in the above-identified patent and that said Letters Patent is hereby corrected as shown below:

COLUMN 12:

Line 18, "conforamce" should read --conformance--;
Line 34, "effected" should read --affected--; and
Line 35, "to be" should be deleted.

Signed and Sealed this

Twenty-seventh Day of October, 1998

Attest:

BRUCE LEHMAN

Attesting Officer

Commissioner of Patents and Trademarks